United States Patent [19]

Sternberg

[11] Patent Number: 4,480,324

[45] **Date of Patent: * Oct. 30, 1984**

[54] CONSTANT BEAMWIDTH FREQUENCY INDEPENDENT ACOUSTIC ANTENNA

[75] Inventor: Robert L. Sternberg, Noank, Conn.

[73] Assignee: The United States of America as represented by the Secretary of the Navy, Washington, D.C.

[ * ] Notice: The portion of the term of this patent subsequent to Apr. 24, 2001 has been disclaimed.

[21] Appl. No.: 483,988

[22] Filed: Apr. 11, 1983

[51] Int. Cl.³ .......... H04B 13/00

[52] U.S. Cl. .......... 367/150; 310/155; 310/180; 310/335

[58] Field of Search .......... 367/150, 153, 155, 157, 367/163, 174, 180; 310/335

[56] References Cited

U.S. PATENT DOCUMENTS

| | | | |
|---|---|---|---|
| 3,433,461 | 3/1969 | Scarpa | 310/335 |
| 3,928,839 | 12/1975 | Warner et al. | 367/150 |
| 4,445,207 | 4/1984 | Sternberg | 367/150 |

OTHER PUBLICATIONS

"Broadband Constant Beamwidth Acoustical Array" by Hixon et al., Technical Memorandum, No. 19, May 1, 1970, Acoustics Research Laboratory Electronics Research Center University of Texas at Austin.

*Primary Examiner*—Harold J. Tudor
*Attorney, Agent, or Firm*—Robert F. Beers; Arthur A. McGill; Prithvi C. Lall

[57] ABSTRACT

A frequency independent log periodic acoustic device is utilized for the transmission or reception of underwater sound. A key element of the device is a particularly shaped plate or diaphragm, called a filter plate, made of stainless steel or other material having suitable acoustic properties. The filter plate on being placed in front of any plane wave receiving or transmitting transducer acts automatically to make the beamwidth of the diffraction pattern of the combined device constant, regardless of frequency. This is achieved by automatically making the effective aperture diameter of the filter plate-transducer combination a constant multiple of the acoustic wavelength of the sound in the underwater medium. When used in conjunction with a scannable transducer such as an acoustic lens and the retina device the filter plate produces a directional, scannable, substantially constant beamwidth diffraction pattern for radiation or reception of underwater acoustic signals. The thickness of the plate at both its center and outer operative diameter are determined by the wavelengths of the respective highest and lowest frequencies to be utilized.

6 Claims, 9 Drawing Figures

CONSTANT BEAMWIDTH FREQUENCY INDEPENDENT ACOUSTIC ANTENNA

STATEMENT OF GOVERNMENT INTEREST

The invention described herein may be manufactured and used by or for the Government of the United States of America for governmental purposes without the payment of any royalties thereon on therefor.

This application is a continuation-in-part of application Ser. No. 784,186 filed Apr. 4, 1977, now U.S. Pat. No. 4,445,207, for Frequency Independent Acoustic Antenna.

BACKGROUND OF THE INVENTION (1) Field of the Invention

The present invention generally relates to acoustic systems and more particularly to underwater sound transmitting or receiving systems having the unique property of having a directional constant beamwidth diffraction pattern over a wide band of frequencies either with or without scanning.

(2) Description of the Prior Art

Many prior art devices in the underwater field have addressed themselves to the problem of providing wide band frequency response so that maximum sound pressure level remains uniform over a wide range of frequencies. The above recited prior art, however, has not addressed itself to the problem of maintaining a constant beamwdith directional diffraction pattern over a wide range of frequencies.

SUMMARY OF THE INVENTION

It is therefore a general object of the present invention to provide an improved acoustic receiving or transmitting mechanism. It is a further object that the acoustic receiving or transmitting mechanism produce a constant beamwidth diffraction pattern over a wide range of frequencies suitable for fixed or scannable directional sound reception or transmission. Another object is that the receiving or transmitting mechanism be suitable for use with underwater sound. Other objects are that the mechanism be suitable for use in oil exploration, ultrasonic medical diagnostics and various other acoustic enterprises. Further objects are that the device be compact, economical, rugged and durable. These and other objects of the invention and the various features and details of construction and operation will become apparent from the specification and drawings.

These several objectives are accomplished in accordance with the present invention by providing an acoustic filter plate functioning as a lens stop for transmitting low frequencies over an effective circular aperture of a large area and high frequencies over an effective circular aperture of a small area. For frequencies between the low and high frequencies the filter plate will transmit an increasing frequency through an effective aperture of decreasing area. The highest frequency stop is located on the central axis of the filter plate and is determined by the highest frequency to be passed. The low frequency cutoff is determined by the thickness of the outer operative portion of the filter plate. A wide band inphase piezoelectric array or any other substantially plane wave wide band transducer placed in back of the filter plate acts in conjunction with the filter plate to produce a directional transmitting or receiving device whose diffraction pattern has a constant beamwidth independent of frequency. In one configuration, the filter plate together with an array or other low profile plane wave transducer forms a thin, flat acoustic antenna capable of receiving or transmitting plane waves incident on the device with a diffraction pattern beamwidth independent of frequency over the spectrum from the high to the low frequencies involved. In another configuration, when the filter plate is placed in front of an acoustic lens or similar wide band scannable transducer, the filter plate acts in conjunction with the transducer to produce a directional, scannable transmitting or receiving device whose diffraction pattern has a beamwidth which is substantially constant independent of frequency over the spectrum from the high to the low frequencies involved and is also scannable at wide angles off the axis of the device.

DESCRIPTION OF THE PREFERRED EMBODIMENTS

Figure 1:
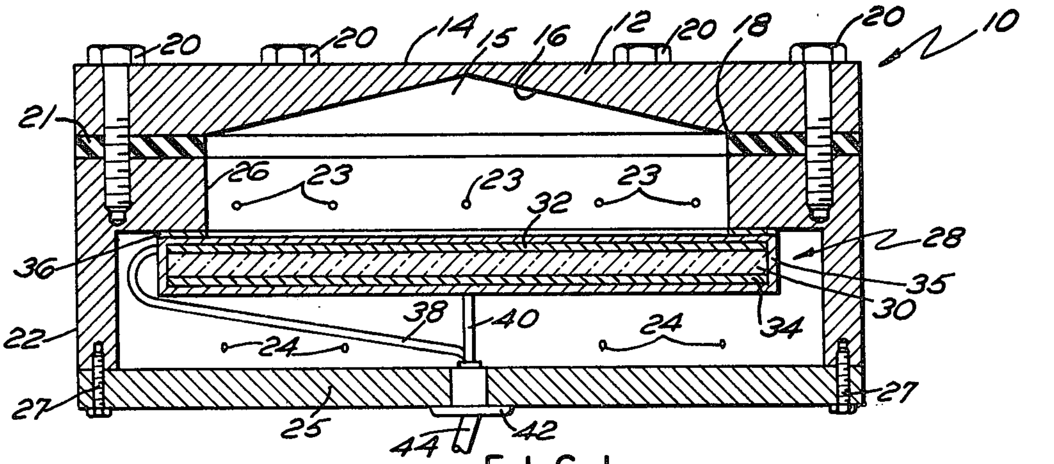
FIG. 1 is a sectional side view of a frequency independent acoustic antenna in accordance with the present invention.

Referring now to FIG. 1 there is generally shown an acoustic antenna mechanism 10 having a stainless steel circular filter plate 12. Plate 12 has a top surface 14 that is planar and a bottom surface 16 that is concave. Alternatively, the bottom surface can be planar and the top surface concave. Plate 12 is normally a figure of revolution with a right circular conical void 15 although other shapes can be used. The thickness of the plate increases from the center to the rim 18. The maximum frequency transmitted by plate 12 at any point on it is a function of the thickness of plate 12. In particular, at the center of the plate higher frequencies are transmitted than near the rim 18. Each portion of the plate has a cutoff frequency with all frequencies lower than the cutoff frequency being transmitted. Using a stainless steel plate of varying thickness with the thickness increasing from the center outward, wavelengths of sound in the metal of the plate shorter than about twenty times the thickness of any portion of plate 12 will be inhibited from that portion outward, from transmitting through the plate. In other words, the thickness of the plate at each point is approximately 1/20 wavelength of the cutoff frequency of the sound in the metal of the plate at that point. All lower frequencies are conducted and all higher frequencies have their transmission inhibited. It is seen that in the present invention low frequencies are transmitted over a large diameter central area of plate 12 and the higher the frequency the smaller the diameter of the conductive central area. Since beam-width is a constant multiple of the ratio $\lambda/d$, where d is the diameter of the central area of the plate 12 which transmits the sound of wavelength $\lambda$ in the water, it can be seen that the square root of the surface area of plate 12 transmitting sound is in direct proportion to the wavelength of the applied signals.

Referring to the remainder of FIG. 1 there is shown a plurality of bolts 20 connecting plate 12 to a yoke 22 through a gasket 21. Housing piece 25 is connected to yoke 22 by bolts 27. Holes 23 and 24, located in yoke 22, are suitable for flooding mechanism 10 when submerged in water during operation. Flooding or other techniques are used to maintain pressure equilibrium and impedance matching on the sensitive components of the device. Yoke 22 has a lip 26 abutting plate 12 through a gasket 21. The inner edge of lip 26 is aligned with the innermost portion of rim 18 with a layer of suitable material to form the gasket 21 so that the portion of the plate 12 containing rim 18 is opaque to transmission of all acoustic frequencies from the plate 12 into the yoke 22. A wide band plane wave transducer 28 has a piezoelectric material 30 and a pair of metallic foils 32 and 34 affixed to either side of material 30. A suitable watertight acoustic material 35 surrounds transducer 28 for maintaining watertight integrity. Transducer 28 is affixed to lip 26 by means of compound 36. A pair of nonhosing conductors 38 and 40 are connected to respective foils 32 and 34 for transmitting electrical signals. A watertight connector 42 passes through housing piece 25 for electrical conductivity purposes. A watertight electrical cable 44 connects the transducer 28 to a conventional signal processing or generating system that is not shown.

In operation as an acoustic receiving or listening device, an acoustic signal exterior to acoustic antenna 10 impinges on filter plate 12. A portion of the filter plate 12 determined by the frequency of the signal and the geometry and material properties of the plate, transmits the acoustic signal to transducer 28. The piezoelectric element 30 converts the acoustic signal to an electrical signal for transmission along conductors 38 and 40.

In operation as an acoustic transmitting device, conductors 38 and 40 carry an electrical signal to piezoelectric element 30. In a known manner the element 30 converts the electrical signal to an acoustic signal. The acoustic signal then impinges on and is transmitted through a portion of plate 12 depending on the frequency of the acoustic signal and the cutoff characteristics of the plate 12.

Figure 2A:
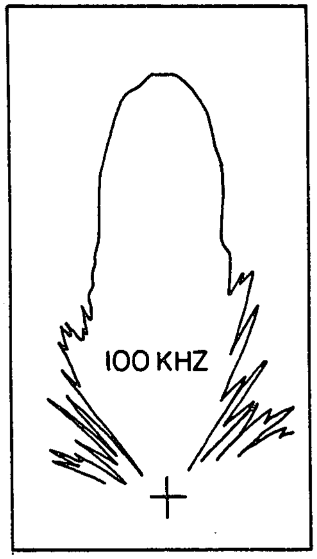
FIGS. 2*a*–2*c* show the axial beam patterns of a typical acoustic antenna of the present invention for various frequencies.
Figure 2B:
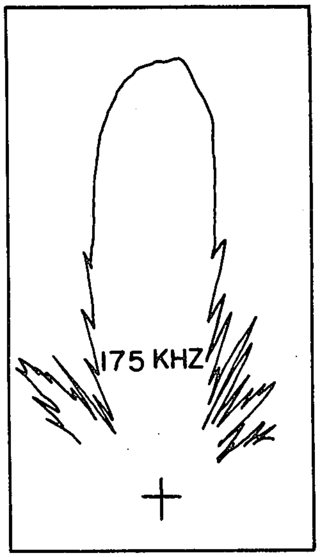
Figure 2C:
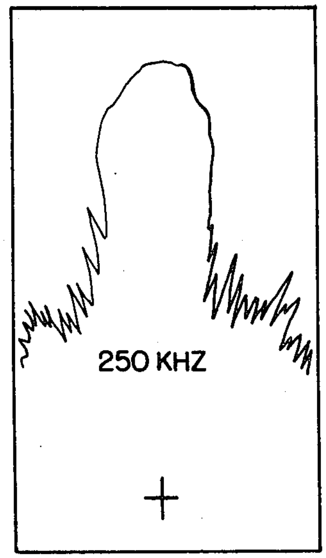

FIGS. 2*a*–2*c* show the frequency independent results achieved with the present invention for axial beams. In FIGS. 2*a*–2*c* the respective signals tested were 100 kHz, 175 kHz, and 250 kHz. The similarities in the beams formed and their beamwidths are to be particularly noted.

Figure 3:
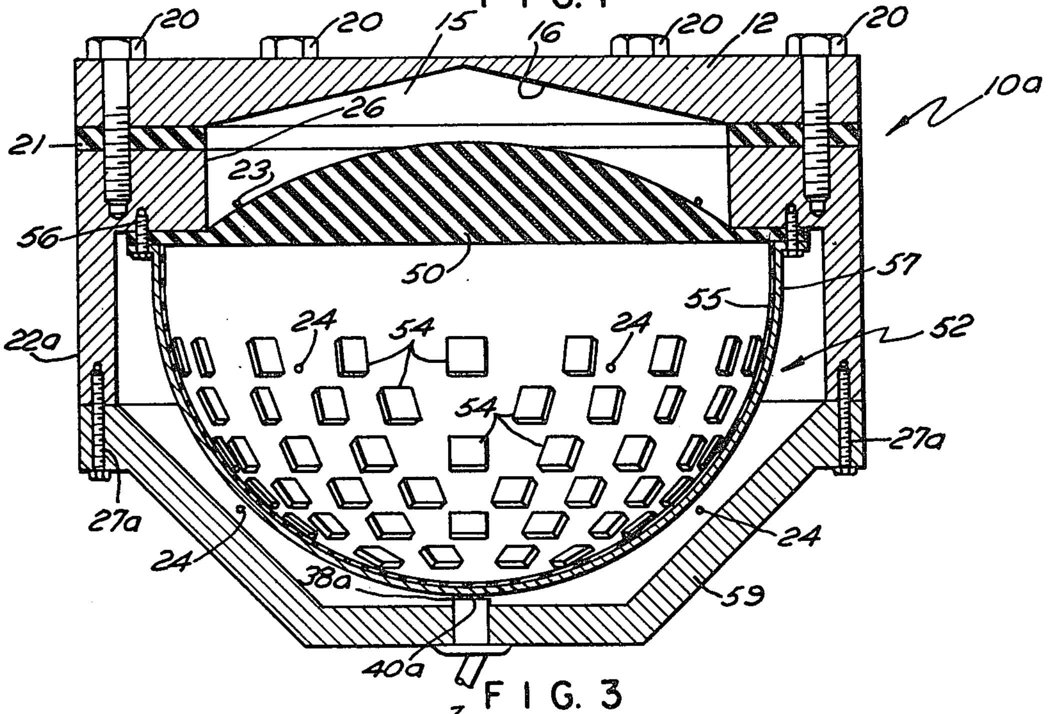
FIG. 3 is a sectional side view of a filter plate, lens and acoustic retina combination for directional frequency independent scanning applications in accordance with the present invention.

Referring now to FIG. 3 there is generally shown an acoustic antenna mechanism 10*a*. Similar components carry the same notation as in FIG. 1. A filter plate 12 is installed in front of a scannable wide bandwidth acoustic lens 50 and retina 52. The retina 52 comprises individual piezoelectric transducer elements 54 acoustically aligned with lens 50. The elements 54 are mounted on shell 57 having a layer of acoustic absorber 55. Each element 54 has a pair of conductors 38*a* and 40*a*. A plurality of bolts 56 hold the retina 52 in place. Apertures 23 and 24 for admitting water are located on the sidewall of yoke 22*a*. A housing piece 59 is connected to yoke 22*a* by means of bolts 27*a*. A watertight connector 42*a* carrying electrical cable 44*a* passes through housing piece 59.

While a lens 50 and retina 52 are shown, other suitable wide band scannable transducer devices can be employed. With such a combination of the filter plate 12 with a wide band scannable transducer a directional, scannable, frequency independent beamwidth device for transmitting or receiving substantially plane wave acoustic signals is then realized. Transmission and reception can be by means of a plurality of independent channels.

Figure 4A:
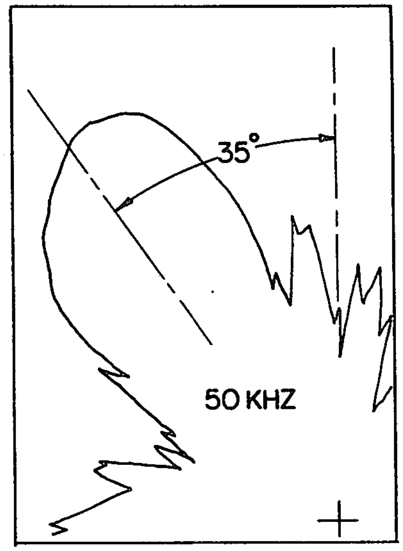
FIGS. 4*a*–4*c* show the scanning beam patterns of a typical acoustic filter plate wide band transducer combination for various frequencies and scan angles.
Figure 4B:
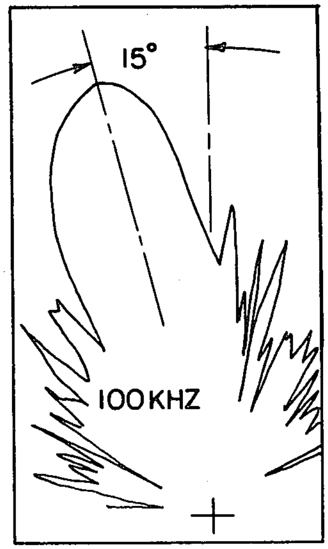
Figure 4C:
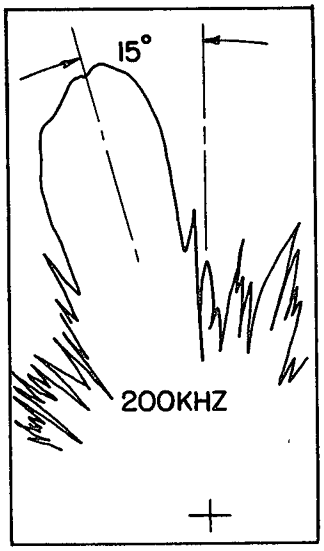

FIGS. 4*a*–4*c* show frequency independent results obtained with the present invention for scanned beams. In FIGS. 4*a*–4*c* the respective signals tested were 50 kHz, 100 kHz and 200 kHz at angles of scan from 35° to 150° as indicated in the figures. The substantial similarity and constancy of the beam shapes and beamwidths are particularly to be noted.

Figure 5:
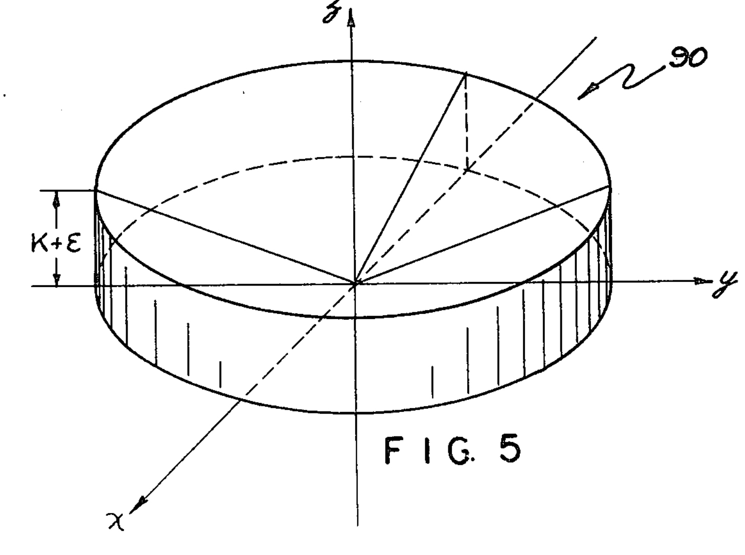
FIG. 5 shows a filter plate referred to Cartesian coordinates.

FIG. 5 shows a filter plate 90 whose surfaces are defined by use of Cartesian coordinates x, y and z. The planar surface is circular and all points on the surface are defined by the equation:

$$z=0 \qquad \text{(eq. 1)}$$

The conical surface defines a cone and all points on the surface are defined by the equation:

$$z = \frac{K}{R}\sqrt{x^2+y^2} + \epsilon \qquad \text{(eq. 2)}$$

wherein R is the radius of the useful part of the plate, K is a constant and $\epsilon$ is the z coordinate of the point at which the cone intersects the z axis. In other words $\epsilon$ is the thickness of the plate at its axis. Therefore $K+\epsilon$ is the thickness of the plate at its perimeter wall where $\sqrt{x^2+y^2}=R$. The parameter $\epsilon$ is small compared to K and can be substantially zero. Moreover $\epsilon$ is less than or equal to (1/20) $\lambda_h$, where $\lambda_h$ is the wavelength of the highest frequency to be used with the plate 90 and K is greater than or equal to 1/20 $\lambda_l$, where $\lambda_l$ is the wavelength of the lowest frequency to be used with the plate 90.

At the radial distances greater than R from the center of the plate it is parallel sided and has surfaces in the $z=0$ and $z=K+\epsilon$ planes for mounting purposes such as shown in FIGS. 1 and 3 but not shown in FIG. 5.

There has therefore been described a uniform beamwidth frequency independent acoustic antenna. The antenna has wide band frequency independent acoustic radiation and receiving properties for unidirectional or multidirectional scannable operation. The filter plate 12 could be made of other metals or of materials of composite structure incorporating provisions for localized phase or aberration correctors. The correctors could be made of polystyrene, plexiglass or other materials in ways obvious to those skilled in the art of acoustic devices. Other obvious variants include curving the plate 12 with or without curving other portions for conformal installation on curved underwater surfaces.

It will be understood that various changes in the details, materials, steps and arrangement of parts, which have been herein described and illustrated in order to explain the nature of the invention, may be made by those skilled in the art within the principle and scope of the invention as expressed in the appended claims.

I claim:

1. An acoustic device adapted for use in an underwater system comprising a filter plate of variable thickness having means for receiving signals, said filter plate having first and second opposing surfaces, said filter plate having said first surface which is substantially planar and said second surface which is substantially right circular conical with the axis of said conical surface perpendicular to said first surface, the thickness of the plate at each point over its surface area being not more than one-twentieth of the wavelength of the acoustic signals to be transmitted at that point.

2. An acoustic device according to claim 1 wherein the thickness of said filter plate along its axis is substantially zero.

3. An acoustic receiver comprising:

acoustic means for preforming a directional receiving beam with a frequency independent beamwidth, said acoustic means including a filter plate of variable thickness having first and second opposing surfaces, said filter plate having said first surface which is substantially planar and said second surface which is substantially right circular conical with the axis of said conical surface perpendicular to said first surface, the thickness of the plate at each point over its surface area being not more than one-twentieth of the wavelength of the acoustic signals to be transmitted at that point; and wide band transducer means in signal communication with said acoustic means for converting the acoustic signals in said receiving beam to electrical signals over a wide range of frequencies.

4. An acoustic receiver according to claim 3 wherein the thickness of said filter plate along its axis is substantially zero.

5. A scannable acoustic receiver comprising:

acoustic means for preforming frequency independent directional scannable beams, said beams for receiving acoustic signals, said acoustic means including a filter plate of variable thickness having first and second opposing surfaces, said filter plate having said first surface which is substantially planar and said second surface which is substantially right circular conical with the axis of said conical surface perpendicular to said first surface, the thickness of the plate at each point over its area being not more than one-twentieth of the wavelength of the acoustic signals to be transmitted at that point;

wide angle focusing means in signal communication with said acoustic means for focusing said received acoustic signals arriving at various angles to the axis of the receiver; and wide band transducing means in signal communication with said acoustic means and said focusing means for converting received and focused acoustic signals to electrical signals, said transducing means including a retina of separate transducing elements each corresponding to a different receiving direction.

6. A scannable acoustic receiver according to claim 5 wherein the thickness of said filter plate along its axis is substantially zero.

* * * * *